Patented Oct. 7, 1952

2,613,191

UNITED STATES PATENT OFFICE 2,613,191

THERMOPLASTIC ADHESIVES

Ralph C. McGaffin, Plainfield, N. J., and Alfred G. Battaglia, New York, N. Y., assignors to National Starch Products Inc., New York, N. Y., a corporation of Delaware No Drawing. Application June 4, 1949, Serial No. 97,312

4 Claims. (Cl. 260—29.2)

This invention relates to an improved thermoplastic adhesive and a method for the manufacture thereof. More specifically, it relates to an adhesive which produces a film which is dry and non-tacky under room temperature conditions, but which becomes tacky and highly adhesive upon the subsequent application of heat.

An object of our invention is to produce a thermoplastic adhesive which may be applied to labels, cartons, boxes, and other surfaces, and which will dry to a film so non-tacky that during the manufacture, shipping, storage, and use of these products, they will not tend to block—that is, to stick to one another, either permanently or momentarily, until such time as heat is applied, whereupon these films will attain their full adhesive power.

Thermoplastic adhesive compositions ordinarily consist of a thermoplastic resin base together with a plasticizing material. The plasticizer is necessary in order that the composition may become sufficiently adhesive and tacky at the desired temperature and (where desired) to attain delayed tack. "Delayed tack" refers to the characteristic whereby a thermoplastic composition, after being heated to a temperature where it becomes adhesive and tacky, thereafter retains its tacky adhesive quality for an interval after heating is discontinued. This property is of interest for certain industrial applications, though not all. However, the use of a plasticizer is essential in practically all commercial thermoplastic adhesive compositions.

The use of ordinary liquid plasticizers—such as, for example, tricresyl phosphate and dibutyl phthalate—was marked by the disadvantage that these liquid plasticizers activated the resin base immediately upon contact therewith, even before heating took place. In other words, a composition containing a resin base together with an effective quantity of a liquid plasticizer, when spread upon labels, carton flaps, or similar surfaces, frequently resulted in a film which was tacky even at room temperature. As already explained, this tackiness represented a grave disadvantage in the manufacture, storage, and use of such adhesive-coated products.

In order to obtain a film which is non-tacky at room temperature in spite of the presence of plasticizers, it has been proposed to compound an adhesive comprising a thermoplastic resin base together with a plasticizer, the plasticizer being one which is normally solid at room temperatures and which exists in the final adhesive film in the form of discrete particles. In effect, these particles of the plasticizing chemical are inactive as plasticizers for the thermoplastic resin base until such time as sufficient heat is applied to fuse the solid plasticizer, whereupon it activates the resin, permitting the composition to attain the desired tackiness and adhesive power.

However, in order that the above-described type of adhesive film, prior to heating, might contain the plasticizer in the necessary form of separate and discrete particles, it has heretofore been considered necessary, during the compounding of the adhesive, to avoid, without exception, any solution or fusing of the plasticizing chemical. In practice, therefore, this has involved the necessity for finely grinding the solid plasticizer and incorporating the finely-ground mass in the adhesive base.

We have now discovered a method for producing an improved thermoplastic adhesive. According to the method of our invention, a plasticizer is used which is normally solid and inactive toward the resin base at room temperatures. However, instead of grinding the solid plasticizer and incorporating it in that form in the resin base, we first heat the plasticizer to melt it to its liquid form and then emulsify this melted plasticizer in water containing polyvinyl alcohol as an emulsifying agent. This emulsion of the plasticizer, upon cooling, is then combined with the resin adhesive base. Marked improvements result, both in the process and in the resulting product.

These improvements include the following:

(1) There is no need for the grinding of dry plasticizer, which ordinarily had to be performed in a ball or pebble mill (a relatively slow, unwieldy expensive operation).

(2) Since, according to our invention, the plasticizer is melted and emulsified before being incorporated with the adhesive base, it is found that the individual particles of plasticizer are of a particle size considerably smaller than is obtainable by ordinary grinding operations. This small particle size is important in the production of smoother, more homogeneous, non-grainy, dried adhesive films.

(3) It has already been pointed out that an essential requirement of the type of thermoplastic adhesive herein described is that the plasticizer particles in the final resin-plasticizer mixture must be inactive toward the resin in order to avoid premature tackiness. Since, by our invention, the plasticizer is first emulsified in water containing polyvinyl alcohol (together with other emulsifying agents or protective colloids, if desired), the resultant plasticizer component in our final adhesive mixture not only exists in the form of discrete particles, but each particle is coated with the emulsifying agent. In other words, not only is the plasticizer separate from and inactive toward the adhesive base (prior to application of heat), but the plasticizer is further separated from the adhesive base by a barrier consisting of the emulsifying agent.

(4) As a result of the coated condition of the plasticizer particles in our final adhesive, it is found that films of our adhesive are more resistant to blocking, as compared to heretofore known thermoplastic adhesive compositions. For example, in the manufacture of labels pre-coated with a thermoplastic adhesive, it is customary to coat the label stock in the form of large sheets. When dry, these sheets are stacked one upon the other and then cut with knives to the proper label size. When the plasticizer in this adhesive has merely been added in the form of finely ground particles, uncoated, it is frequently found that the heat generated by the friction of the knives cutting through the paper stock is sufficient to cause a fusing of the plasticizer, with subsequent adhesiveness; this, in turn, resulting in the edges of the labels (where the cutting operation has taken place) sticking to one another. It is clear that in high-speed commercial operations, such adhesion of labels, one to the other, can cause considerable delay and damage. On the other hand, we have found that when using the adhesive of our invention, wherein the discrete particles of plasticizer are coated with the emulsifying agent, such premature sticking or blocking is avoided, resulting in more rapid and safer operation.

(5) By varying the proportion of polyvinyl alcohol in the plasticizer emulsion, we can vary two properties of the final adhesive—namely, its activating temperature and the degree of delayed tack. "Activating temperature" as herein used, refers to the temperature at which the dry film of the composition becomes tacky and adhesive. "Delayed tack" has already been defined as that characteristic whereby a thermoplastic adhesive, after being heated to its activating temperature, remains tacky for an interval, after heating has been discontinued. With increasing proportions of polyvinyl alcohol, the activating temperature of the final adhesive is increased, and its interval of delayed tack is reduced.

(6) It is found that as a result of our use of polyvinyl alcohol as at least one of the emulsifying agents, the eventual adhesive film attains an additional advantageous property—namely, improved speed of adhesion to wet surfaces. In the case of ordinary thermoplastic adhesives, even when the plasticizer exists in the form of discrete, unfused (but uncoated) granules, adhesion to wet objects is not always satisfactory. In the case of our product, the water solubility of the emulsifying agent improves initial tackiness, which maintains adhesion until the actual thermoplastic base can grasp the surface.

As the adhesive base for our product, we use any polymeric material which is thermoplastic in character. These materials may be in the form of aqueous latices, suspensions, dispersions, or even in the form of solutions in organic solvents, provided that the solvent for the adhesive base is not also a solvent for the plasticizer chosen.

We have herein broadly used the term "resin base" to include all such thermoplastic polymeric materials. Those familiar with the art will be in a position to choose the particular base to meet specific conditions and circumstances under which the adhesive is to be employed. Examples of such thermoplastic bases include polyvinyl acetate, polyvinyl chloride, polyvinyl acetate-chloride copolymer, polyvinylidene chloride (Saran), methacrylic resins (Acrysols), non-drying alkyds, non-drying phenolics, polystyrenes, thermoplastic cellulose esters and ethers, coumarone-indene resins, ester gums, synthetic rubber types, and the like.

For the plasticizer, we use one which will be solid at room temperatures and which, when dispersed throughout the thermoplastic resin base, will remain in the form of discrete particles, inactive as a plasticizer toward the resin until such time as sufficient heat is applied to fuse the plasticizer particles in the resin base, thereupon bringing about the desired plasticization and adhesiveness.

We prefer to use a plasticizer which has a melting point below 100° C. It is also possible to use a blend of plasticizers wherein, although one of the components may have a melting point higher than 100° C., nevertheless, the blend as such will melt at a temperature below 100° C. Representative examples of plasticizers which are normally solid at room temperatures, and which would be inactive as plasticizers at such temperatures toward the thermoplastic resin bases, include diphenyl phthalate, triphenyl phosphate, diphenyl, tridichlor phenyl phosphate, Santowax M and P (sold by the Monsanto Chemical Company, and which we believe to be meta and para terphenyls), tri paratertiarybutyl phenyl phosphate (sold by the Dow Chemical Company under the trade name Plasticizer 7), N-cyclohexyl para-toluene sulphonamide (such, for example, as is sold by Monsanto Chemical Company under the trade name Santicizer I-H), a suitable mixture of ortho and para toluene sulfonamides (such, for example, as is sold by the Monsanto Chemical Company under the trade name Santicizer 9), and dicyclohexyl phthalate.

The quantity of plasticizer to be used varies with the molecular weight of the particular resin base in the composition, as well as with the degree of eventual plasticity and tack desired in the final adhesive. Thus, a low molecular weight polyvinyl acetate will require less plasticization than high molecular weight polyvinyl acetate or high molecular weight polyvinylidene chloride or methacrylates. Generally, it is not considered necessary to use more than approximately 300% of plasticizer, based on the dry weight of the resin solids in the adhesive base.

In the preparation of the emulsion of the plasticizer (which emulsion is to be subsequently mixed with the resin base), we prefer to melt the plasticizer to its liquid form and then to pour this liquid slowly, with continuous agitation, into hot water; the hot water containing polyvinyl alcohol as the emulsifying agent. The temperature of the water should, in all cases, be higher than the crystallizing point of the melted plasticizer being emulsified therein, in order that a homogeneous emulsion may be formed.

As previously stated, we may use, besides the polyvinyl alcohol, such other emulsifying agents, protective colloids, or wetting agents, as may be desired, including, for example, sodium carboxymethylcellulose, polyether alcohols, dioctyl sulfosuccinate, and the like.

The proportion of polyvinyl alcohol in the emulsion mixture may be varied over a wide range, although we ordinarily prefer to use no more than about 5%, based on the total weight of the emulsion (i. e., water plus plasticizer plus emulsifying agent). The actual amount of polyvinyl alcohol to be used will vary with such factors as the viscosity of the polyvinyl alcohol employed, the particular plasticizer involved, the viscosity desired in the final emulsion, the particular activation temperature and degree of delayed tack desired in the final adhesive, as well as the type and quantity of such other emulsifying agents or protective colloids as may be present. Ordinarily, the higher the viscosity of the polyvinyl alcohol, the less one needs to use in preparing the emulsion. Also, as already stated, by increasing the proportion of polyvinyl alcohol in the plasticizer emulsion, it is possible to increase the activation temperature of the final plasticized resin adhesive, and to reduce its interval of delayed tack. It must be remembered, of course, that the characteristics of activation temperature and delayed tack are also controlled by the nature and proportions of the particular resin bases and plasticizers chosen.

In order to improve still further the non-tacky, non-blocking characteristic of the final adhesive film, and to impart a particularly smooth, slippery surface thereto, we have found that waxy substances—such as natural and synthetic waxes, glycerides, and the like—may be added and emulsified together with the plasticizer. The quantity of such waxy materials is kept low, since too great a proportion will tend to interfere with the adhesiveness of the subsequent composition. For this same purpose of improving the non-tacky properties of the final film, we also sometimes find it desirable to add small quantities of inert fillers, such as clays. Such fillers need not ordinarily be added to the emulsion, but may be incorporated directly with the adhesive base. However, it is also possible to use a filler, such as bentonite clay, which possesses emulsifying and stablizing properties—in such case, the clay may be incorporated in the plasticizer emulsion. By "small quantities," we refer to quantities not more than approximately 5% of the total weight of the final adhesive.

When the emulsion of the plasticizer in water has been prepared, it is mixed with the thermoplastic resin base. Before the emulsion is added to the resin base, it is important that the emulsion be cooled to room temperature, or at least to a temperature so low that there will be no possibility of the plasticizer activating the resin. It will be apparent to those familiar with the art that in all such formulations, additional water may be added to adjust the consistency and solids content of the product in order to meet given conditions.

The following examples will further illustrate the embodiment of our invention.

Example I

In this, and in the subsequent examples, all parts given are by weight.

1.8 parts of polyvinyl alcohol were dissolved in 22.8 parts of water, the temperature of the solution being maintained at 180° F. The grade of polyvinyl alcohol used in this example was that sold by E. I. du Pont de Nemours & Company under the trade name Elvanol 52–22, having a degree of hydrolysis within the range 86–89% and a viscosity of 20–25 cps., when determined upon a 4% aqueous solution at 20° C. upon a Hoeppler viscosimeter (falling ball method). 20.4 parts of diphenyl phthalate were melted and poured into the heated polyvinyl alcohol solution, with rapid agitation, forming an emulsion of the diphenyl phthalate in water. This emulsion was cooled to 90° F. or lower and thoroughly mixed with the following ingredients:

35 parts ammonium hydroxide dispersion of modified rosin (sold by the Hercules Powder Company under the trade name Dresinol 40)
13 parts aqueous dispersion of polystyrene (sold by the Monsanto Chemical Company under the trade name Lustron Latex X620)
7 parts water.

A smooth, creamy fluid resulted which, when spread on surfaces of labels, cartons, and the like, dried to a smooth film, completely non-adhesive and non-tacky at room temperatures. Although the dried film was smooth, non-grainy, and apparently completely homogeneous when examined by the naked eye, microscopic examination showed the plasticizer to be present in the form of entirely discrete particles, uniformly dispersed throughout the resin base. Determination of the size of the plasticizer particles indicated that a substantial proportion ranged as low as two microns, the average particle size being below five microns. Upon heating the film, it became tacky and powerfully adhesive.

Example II

The procedure of Example I was repeated, using the same ingredients, except that in place of the 1.8 parts of polyvinyl alcohol, there were used 1.0 part of polyvinyl alcohol and 0.8 part of a 30% aqueous solution of polyether alcohol (sold by the Rohm & Haas Company under the trade name Triton NE). A smooth, creamy fluid resulted, comparable in properties to the product of the previous example.

Example III

The procedure of Example I was repeated, using the same ingredients, except that at the time that the plasticizer emulsion was added to the resin base, there were simultaneously added 5 parts of china clay, preferably of a fine particle size. A smooth, creamy fluid resulted, comparable in properties to the product of Example I.

Example IV

Five (5) parts of polyvinyl alcohol were dissolved in 55 parts of water at 180° F. The polyvinyl alcohol was of the grade sold by E. I. du Pont de Nemours & Company under the trade name Elvanol 50–42, having a degree of hydrolysis within the range of 86–89% and a viscosity of 35–45 cps., when determined upon a 4% aqueous solution in the manner described in Example I. Forty (40) parts of dicyclohexyl phthalate were melted and poured into the heated polyvinyl alcohol solution, with rapid agitation, forming an emulsion of the dicyclohexyl phthalate in water. Sixty-five (65) parts of this emulsion, after cooling below 90° F., were then thoroughly mixed with 8 parts of an aqueous dispersion of acrylic polymers (sold by the Rohm & Haas Company under the trade name Acrysol C–9) and 6 parts of an aqueous dispersion of acrylic polymers (sold by the Rohm & Haas Company under the trade name Acrysol WA–5). A smooth, creamy fluid resulted which, when spread upon surfaces, dried to a non-tacky, smooth film, becoming powerfully adhesive when heated.

Example V

Five (5) parts of polyvinyl alcohol (Elvanol 52–22) were dissolved in 53 parts of water, heated as in the previous examples. Forty-two (42) parts of triphenyl phosphate were melted and poured slowly into the polyvinyl alcohol solution, with rapid agitation. After cooling, 65 parts of this emulsion were thoroughly mixed with the following ingredients.

30 parts ammonium hydroxide dispersion of modified rosin (Dresinol 40)
5 parts aqueous dispersion of polystyrene (Lustron Latex X620)
10 parts aqueous dispersion of a copolymer of styrene and butadiene (sold by the Dow Chemical Company under the trade name Dow 513).

A smooth, creamy fluid resulted, comparable in properties to the products of the previous examples.

Example VI

Two (2) parts of Elvanol 50–42 and 30 parts of Dresinol 40 were dissolved in 42 parts of water heated to approximately 180° F. It should be mentioned that the Dresinol 40 in this example functions as an added emulsifying agent as well as imparting adhesive properties to the final product. Forty-five (45) parts of diphenyl phthalate were melted and poured slowly into this solution, with rapid agitation.

After cooling, 65 parts of this emulsion were thoroughly mixed with 20 parts of additional Dresinol 40 and 20 parts of polystyrene emulsion (sold by the Dow Chemical Company under the trade name Dow Latex 579). A smooth, creamy fluid resulted, comparable in properties to the products of the previous examples.

Example VII

The following ingredients were dissolved in 68.5 parts of water at approximately 180° F., with agitation:

0.5 part Elvanol 52–22
1.0 part sodium carboxymethyl cellulose (sold by E. I. du Pont de Nemours & Company under the trade name Sodium CMC 4WH)
20.0 parts Dresinol 40
7.0 parts potassium resinate (sold by the Hercules Powder Company under the trade name Dresinate 90).

Forty-five (45) parts of diphenyl phthalate were melted and poured slowly into this solution, with rapid agitation. After cooling, 65 parts of the emulsion thus formed were mixed with 16 parts of Acrysol C–9. A smooth, creamy fluid resulted, comparable in properties to the products of the previous examples.

Example VIII 2.5 parts of Elvanol 50–42 and 1 part of dioctyl sodium sulfosuccinate (sold by American Cyanamid & Chemical Corporation under the trade name Aerosol OT 100%) were dissolved in 53 parts of water, maintained at approximately 180° F. Forty-five (45) parts of diphenyl phthalate were melted and poured slowly into the above solution, with rapid agitation. Upon cooling, 65 parts of the emulsion thus formed were mixed with 30 parts of Dresinol 40 and 15 parts of a polyvinyl chloride plasticizer with nitrile rubber (sold by the B. F. Goodrich Chemical Company under the trade name Geon Polyblend Latex 550X20). A smooth, creamy fluid resulted, comparable in properties to the products of the previous examples.

Example IX

Five (5) parts of Elvanol 50–42 were dissolved in 55 parts of water, heated as in the previous examples. Forty (40) parts of dicyclohexyl phthalate were melted and poured slowly into the well-agitated polyvinyl alcohol solution. Sixty-five (65) parts of the emulsion thus formed, after cooling, were mixed with 35 parts of polyvinyl acetate emulsion (of the grade sold by E. I. du Pont de Nemours & Company under the trade name Elvacet 81A900). A smooth, creamy fluid resulted, comparable in properties to the products of the previous examples.

Example X

The procedure of Example I was repeated, using the same ingredients, except that in place of the 20.4 parts of diphenyl phthalate, there was used a mixture of 16.4 parts of diphenyl phthalate and 4 parts of a mixture of ortho- and paratoluene sulfonamides (of the grade sold by the Monsanto Chemical Company under the trade name Santicizer #9). This illustrates the use of a mixture of plasticizers wherein one has a melting point higher than 100° C. (Santicizer #9 has a melting point of approximately 105° C. and the diphenyl phthalate has a melting point of 69° C.)

Example XI

This example describes an experiment that was run in order to demonstrate the reduction in the interval of delayed tack for a given adhesive composition, by increasing the proportion of polyvinyl alcohol in the plasticizer emulsion.

Two identical thermoplastic resin bases were prepared, each consisting of a mixture of 13.0 parts of Lustron X620, 35.1 parts of Dresinol 40, and 6.9 parts of water. Into one of these resin bases was incorporated an emulsion of 20.4 parts of diphenyl phthalate in 23.1 parts of water, containing 1.5 parts polyvinyl alcohol (Elvanol 50–42). This product was known as sample A.

Into the other resin base was incorporated an emulsion of 20.4 parts of diphenyl phthalate in 21.6 parts of water, containing 3.0 parts of the same grade of polyvinyl alcohol (in other words, twice as much polyvinyl alcohol as in sample A). This sample was known as sample B.

Two sheets of label stock paper, 60-pound weight, were coated on one side with the adhesive of samples A and B, respectively. The thickness of the adhesive film, immediately upon application and before drying, was .002 inch. The coated sheets were air-dried at 72° F. for two days. Each sheet was then cut into strips 1½ inches x ¾ inch.

Heat was then applied to the strips, in such a manner that only a one-inch length of each strip was heated. The strips were thus heated for ten (10) seconds at 180° F., in order to activate the adhesive thoroughly on the heated portion, while allowing a half-inch portion at the end of each strip to remain unheated and, therefore, non-tacky. After activation, the different strips were held for varying periods of time at 72° F. before being applied to a clean glass surface. The purpose of this time lag before application of the coated strips to the glass was to ascertain the period during which the strips would remain adhesive after heating was discontinued; in other words, the period of delayed tack. One hour after being applied to the glass surface, the adhesion of each strip was tested and it was found that with the strips of sample A, the desired adhesion was obtained with a delayed tack up to an interval of three (3) minutes, and with the strips of sample B, the desired adhesion was obtained with a delayed tack up to an interval of twenty (20) seconds.

We claim:

1. The method of making a thermoplastic adhesive composition suitable for the production of thin, dried adhesive coatings which are non-tacky at room temperatures but which are activatable to a tacky and adhesive condition by heat which consists, in melting a solid plasticizer, in mixing the melted plasticizer with an emulsifying agent in an aqueous medium and producing an emulsion of the plasticizer particles in which the plasticizer particles are coated with the emulsifying agent, and then mixing the emulsion with a thermoplastic polymeric material and producing the thermoplastic adhesive composition, the resolidified plasticizer particles being dispersed in the composition and being physically separated in the form of discrete particles from the thermoplastic polymeric material thereof, the said coated plasticizer particles being inactive towards the thermoplastic polymeric material at room temperature but being fusible and rendered activated as a plasticizer for said thermoplastic polymeric material to render coatings thereof tacky and adhesive under heat applied to such coatings.

2. The method of making a thermoplastic adhesive composition suitable for the production of thin, dried adhesive coatings which are non-tacky at room temperatures but which are activatable to a tacky and adhesive condition by heat which consists, in melting a solid plasticizer, in mixing the melted plasticizer with an emulsifying agent in an aqueous medium and producing an emulsion of the plasticizer particles in which the plasticizer particles are coated with the emulsifying agent, cooling said emulsion, and then mixing the emulsion with a thermoplastic polymeric material and producing the thermoplastic adhesive composition, the resolidified plasticizer particles being dispersed in the composition and being physically separated in the form of discrete particles from the thermoplastic polymeric material thereof, the said coated plasticizer particles being inactive towards the thermoplastic polymeric material at room temperature but being fusible and rendered activated as a plasticizer for said thermoplastic polymeric material to render coatings thereof tacky and adhesive under heat applied to such coatings.

3. The method of claim 1, in which the emulsifying agent comprises polyvinyl alcohol.

4. A thermoplastic adhesive composition produced by the method of claim 3.

RALPH C. McGAFFIN.
ALFRED G. BATTAGLIA.

REFERENCES CITED

The following references are of record in the file of this patent:

UNITED STATES PATENTS

| Number | Name | Date |
|---|---|---|
| 1,719,948 | Teague | July 9, 1929 |
| 2,217,119 | Kerr | Oct. 8, 1940 |
| 2,279,771 | Austin | Apr. 14, 1942 |
| 2,462,029 | Perry | Feb. 15, 1949 |